United States Patent [19]

Dellinger, Jr. et al.

[11] Patent Number: 5,435,445
[45] Date of Patent: Jul. 25, 1995

[54] METHOD OF OPERATING A REVERSE VENDING MACHINE

[75] Inventors: William R. Dellinger, Jr., Sterling; Rusty Driscoll, Leesburg, both of Va.

[73] Assignee: Environmental Products Corporation, Fairfax, Va.

[21] Appl. No.: 176,446

[22] Filed: Dec. 30, 1993

[51] Int. Cl.⁶ .............................................. B07C 5/00
[52] U.S. Cl. .................... 209/576; 209/580; 209/583; 209/587; 209/524
[58] Field of Search ............... 209/576, 577, 580, 581, 209/582, 583, 587, 588, 524, 523

[56] References Cited

U.S. PATENT DOCUMENTS

| | | | |
|---|---|---|---|
| 4,248,334 | 2/1981 | Hanley et al. | 194/4 |
| 4,285,426 | 8/1981 | Cahill | 194/209 |
| 4,324,325 | 4/1982 | DeWoolfson | 194/4 |
| 4,440,284 | 4/1984 | DeWoolfson | 194/4 |
| 4,454,028 | 6/1984 | Vetter et al. | 209/548 |
| 4,492,295 | 1/1985 | DeWoolfson | 194/4 |
| 4,499,984 | 2/1985 | Tuten et al. | 194/4 |
| 4,510,857 | 4/1985 | LaBarge et al. | 100/53 |
| 4,573,641 | 3/1986 | DeWoolfson et al. | 241/36 |
| 4,579,216 | 4/1986 | DeWoolfson et al. | 194/212 |
| 4,597,487 | 6/1986 | Crosby et al. | 194/209 |
| 4,653,627 | 3/1987 | Hampson et al. | 194/209 |
| 4,784,251 | 11/1988 | DeWoolfson et al. | 194/209 |
| 4,829,428 | 5/1989 | Weitzman et al. | 364/401 |
| 4,953,682 | 9/1990 | Helbawi | 194/208 |
| 5,028,870 | 7/1991 | Reed . | |
| 5,111,927 | 5/1992 | Schulze, Jr. | 194/209 |
| 5,141,110 | 8/1992 | Trischan et al. | 209/524 |
| 5,161,661 | 11/1992 | Hammond | 209/583 X |
| 5,226,519 | 7/1993 | DeWoolfson | 194/205 |
| 5,257,511 | 3/1981 | Miller | 194/4 |

FOREIGN PATENT DOCUMENTS

| | | | |
|---|---|---|---|
| 361430 | 4/1990 | European Pat. Off. | 209/580 |
| 0488952A2 | 6/1992 | European Pat. Off. . | |
| 3731402 | 12/1988 | Germany | 209/577 |
| WO92/05523 | 4/1992 | WIPO . | |

*Primary Examiner*—David H. Bollinger
*Attorney, Agent, or Firm*—Finnegan, Henderson, Farabow, Garret & Dunner

[57] ABSTRACT

An article collection system includes a housing having a port for receiving articles, such as aluminum cans, glass bottles, and plastic bottles. The assembly also includes a mechanism for classifying the articles, and for densifying the articles.

46 Claims, 14 Drawing Sheets

FIG. 14

| | INTENSITY | COLOR | POLARIZATION | METALLIC |
|---|---|---|---|---|
| SET 1 | | | | |
| SET 2 | | | | |
| SET 3 | | | | |
| SET 4 | | | | |
| SET 5 | | | | 14010 |
| SET 6 | | | | |
| SET 7 | | | | |
| SET 8 | | | | |
| SET 9 | | | | |
| ... | | | | |
| SET #T | INTENSITY | COLOR | POLARIZATION | METALLIC |

| | |
|---|---|
| VALUE 1 | GREEN PET-OR-GLASS |
| VALUE 2 | GREEN PET-OR-GLASS |
| VALUE 3 | GREEN PET-OR-GLASS |
| | GREEN PET-OR-GLASS |
| | GREEN PET |
| | GREEN PET |
| | GREEN PET-OR-GLASS |
| | GREEN PET |
| | GREEN PET |
| ⋮ | ⋮ |
| VALUE P | GREEN PET-OR-GLASS |

METHOD OF OPERATING A REVERSE VENDING MACHINE

BACKGROUND OF THE INVENTION

1. Field of the Invention

This invention relates to the collection and storage of articles, and, more particularly, to a machine for classifying and storing recyclable articles.

2. Description of Related Art

With the increasing emphasis on environmental protection, the recycling of used beverage containers, such as aluminum, glass, plastic containers and other similar articles has become an important factor in the conservation effort.

On the other hand, non-returnable containers for beverages and other goods are widely used because their cost has been less than the cost of recycling and/or cleaning reusable deposit containers and bottles. One significant effect of the widespread use of non-returnable containers has been increased litter in public places, and overflow of garbage dumps and landfills.

To combat litter and increase the amount of material that is recycled, several states have enacted mandatory "deposit laws" that require containers to have an added deposit cost. When the consumer purchases a product in such a container, a container deposit, typically one to five cents, is added to the purchase price. After consumption of the product, the consumer can obtain a refund of the deposit by returning the empty container, often to the retailer, for recycling. The amount of the deposit may be adjusted to create an incentive for returning the container that is greater than the inconvenience in doing so. In these states, retailers generally collect the used containers and sell them to distributors or others who pay the retailer for the scrap value of the containers plus an amount to cover the retailer's handling costs.

Since the high labor cost of processing recycled material often makes recycling nonprofitable, especially for retailers, various automatic machines that accept material for recycling and issue deposit refunds have been proposed. These machines relieve the burdens on the grocery industry and those who must collect the containers, pay the refunds, and store the returned articles. For example, Applicant's assignee is the owner of U.S. Pat. Nos. 4,324,325, 4,345,679, 4,440,284, 4,469,212, 4,492,295, 4,573,641, 4,579,216, 4,784,251, and 5,226,519. All of these patents relate to machines and systems for automated redemption of beverage containers.

Another approach to improving the economics of recycling is to increase the scrap value of the recycled material. One method for increasing the scrap value is to segregate the returned material into groups having a scrap price inherently higher than the scrap price of unsegregated material. Separation of scrap by composition (for example, glass and plastic) or by color (for example, clear glass and green glass) greatly increases the value of the scrap material. Separation of plastic scrap further according to chemical make-up is also desirable, for example, when vinyl-based container scrap is excluded from mixture with high density polyethylene, polypropylene, and polyethylene terephthalate (PET) container scrap.

In the past, segregation of returned containers has been labor intensive, so that the labor to perform the sorting can sometimes cost more than the increase in resale value of the segregated material.

U.S. Pat. No. 5,226,519 discloses a device for receiving various different types of articles and maintaining separation of each type. This device includes a plurality of collection stations for receiving a plurality of articles through a plurality of insert ports, each port for receiving one different predetermined type of article. The device requires the consumer to first insert all containers of one type (for example, cans) into one collection station, and receive a payment for those containers. Next, the consumer inserts containers of another type in another collection station for a separate payment. A consumer having three types of containers to recycle must therefore stand in three separate lines at three separate collection stations and receive three separate payments. Further, the multiple stations require the retailer to provide a large amount of space to house the devices.

SUMMARY OF THE INVENTION

Accordingly, it is an object of the present invention to efficiently classify recyclable articles.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention is directed to a method of processing collected articles, comprising the steps of determining a physical attribute of a collected article; reading a code on the collected article; selectively routing the article through a first path when the physical attribute corresponds to the code; and otherwise, routing the article through a second path, different from the first path.

According to another aspect of the invention, an article collection assembly comprises a housing having a port for receiving an article; means for determining a physical attribute of a received article; means for reading a code on the received article; selectively routing the article through a first path when the physical attribute corresponds to the code; and otherwise, routing the article through a second path, different from the first path.

According to another aspect, the present invention concerns a method of sorting articles comprising the steps of illuminating the article; receiving light from the article; generating a signal corresponding to light received from P portions of the article; analyzing the signal to determine, for each portion of the article, a type corresponding to the portion; determining the type corresponding to the maximum number (M) of portions; determining a first value based on M; determining a second value based on the determined type; comparing the first value to the second value; selectively routing the article through a first path based on the result of the comparing step; and otherwise routing the article through a second path, different from the first path.

It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of the specification illustrate a preferred embodiment of the invention. Together with the description, they serve to explain the objects, advantages and principles of the invention. In the drawings:

FIG. 14 is a diagram illustrating a data structure processed by the processing operations shown in FIGS. 11, 12, and 13; and FIG. 15 is a diagram illustrating another data structure processed by the processing operations shown in FIGS. 11, 12, and 13.

DESCRIPTION OF THE PREFERRED EMBODIMENT

Reference will now be made in detail to the present preferred embodiment of the invention, as illustrated in the accompanying drawings.

Figure 1:
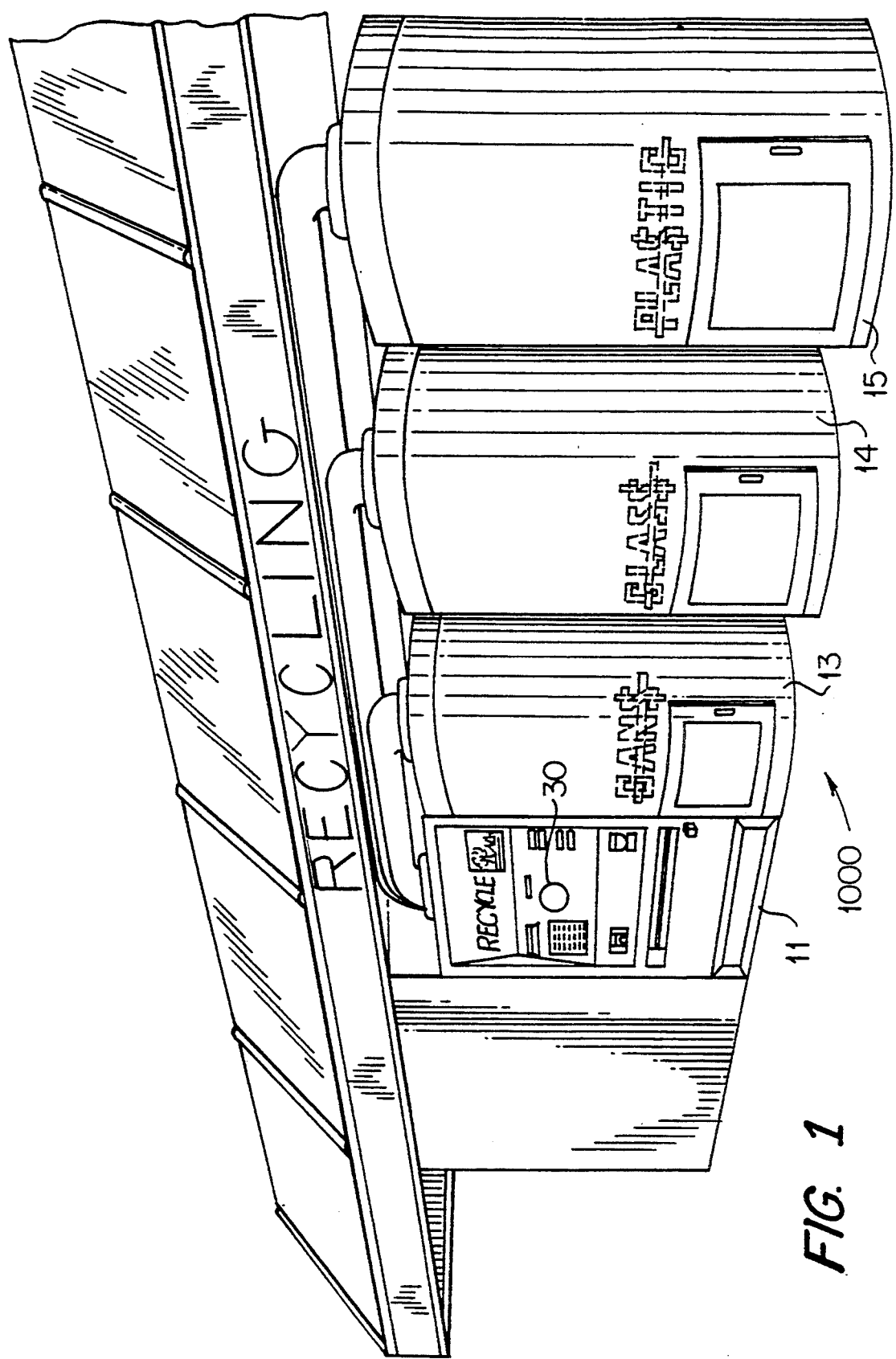
FIG. 1 is a perspective view of an article collection system in accordance with a preferred embodiment of the present invention.

As shown in FIG. 1, the preferred collection system 1000 includes a reverse vending machine (RVM) 11, and plurality of storage bins 13, 14 and 15 for separately storing densified articles according to the composition of the article. Storage bin 13 stores densified aluminum, storage bin 14 stores densified glass, and storage bin 15 stores densified plastic. RVM 11 accepts an article from a consumer through insert port 30. RVM 11 then classifies the article, and either rejects the article or densifies the article and sends the densified article to one of storage bins 13, 14 or 15, as described in more detail below.

Figure 2:
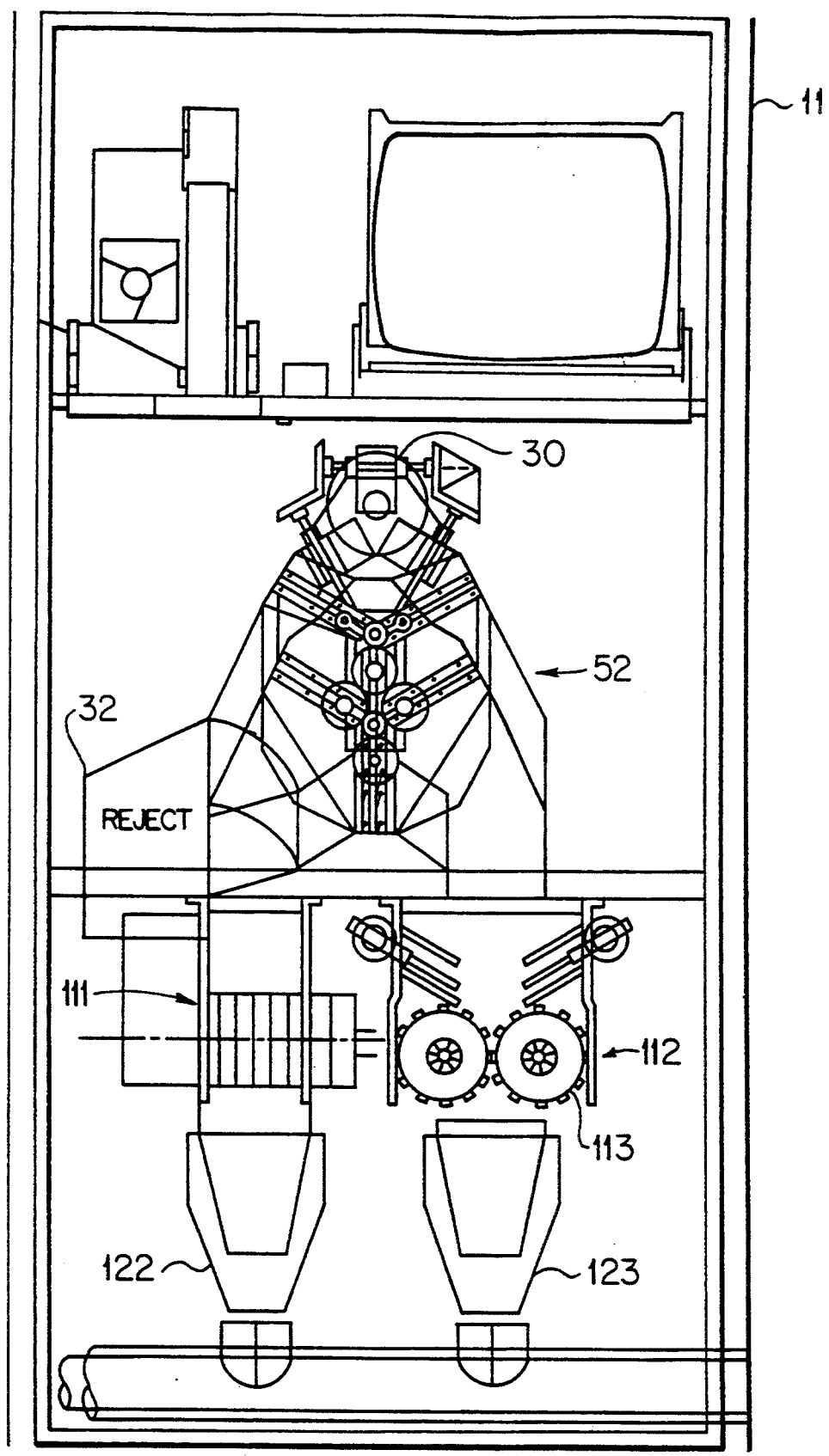
FIG. 2 is a front view of a portion of the preferred collection system.

FIG. 2 shows a front view of the interior of RVM 11. Classification mechanism 52 classifies articles received through insert port 30, and sends each classified article to either reject chute 32 for return to the consumer, shredding assembly 111, or crushing assembly 112. RVM 11 sends densified material to one of the storage bins via chute 122 or chute 123.

Figure 3:
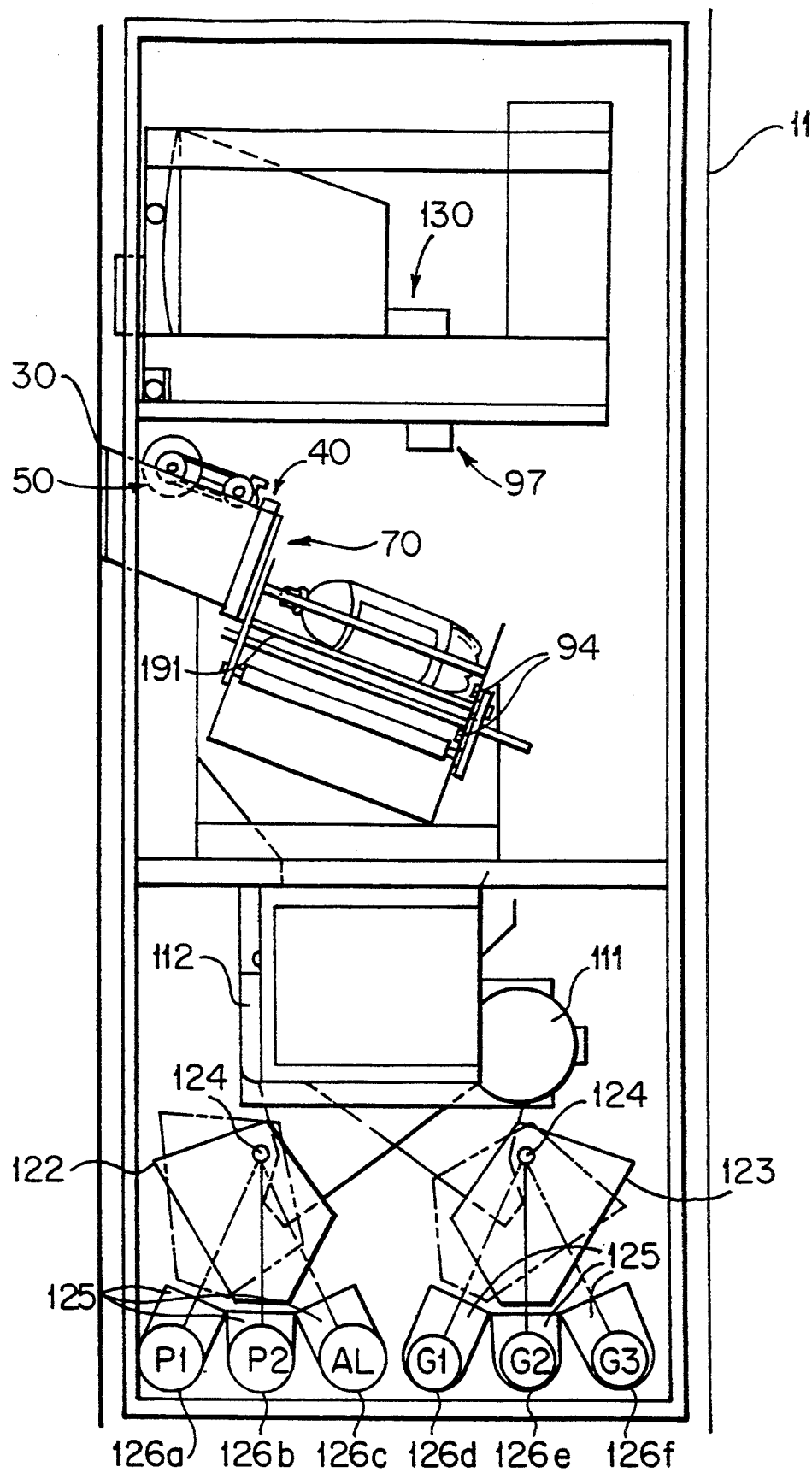
FIG. 3 is a side view of the portion of the preferred collection system shown in FIG. 2.

FIG. 3 shows a side view of the interior of RVM 11, including an iris 40 and an intake mechanism 50. When RVM 11 accepts an article through port 30, iris 40 opens and intake mechanism 50 propels the article into the interior of RVM 11. As the article travels through iris 40, sensing station 70 analyzes the article. After the article is in the interior of RVM 11, iris 40 closes, and scale 94 weighs the article. Rollers 191 then rotate the article and laser scanner 97 reads a bar code on the article. RVM 11 then directs the article to either reject chute 32, shredder 111 or crusher 112.

Chute 123 pivots about pivot 124 to direct the densified material from crusher 112 to one of intake ports 126d, 126e or 126f, based upon whether the article is clear, brown, or green. Similarly, chute 122 pivots about pivot 124 to direct the article from shredder 111 to one of inlets 126a, 126b, or 126c, based on whether the article is plastic or aluminum and on the type of plastic.

Figure 4:
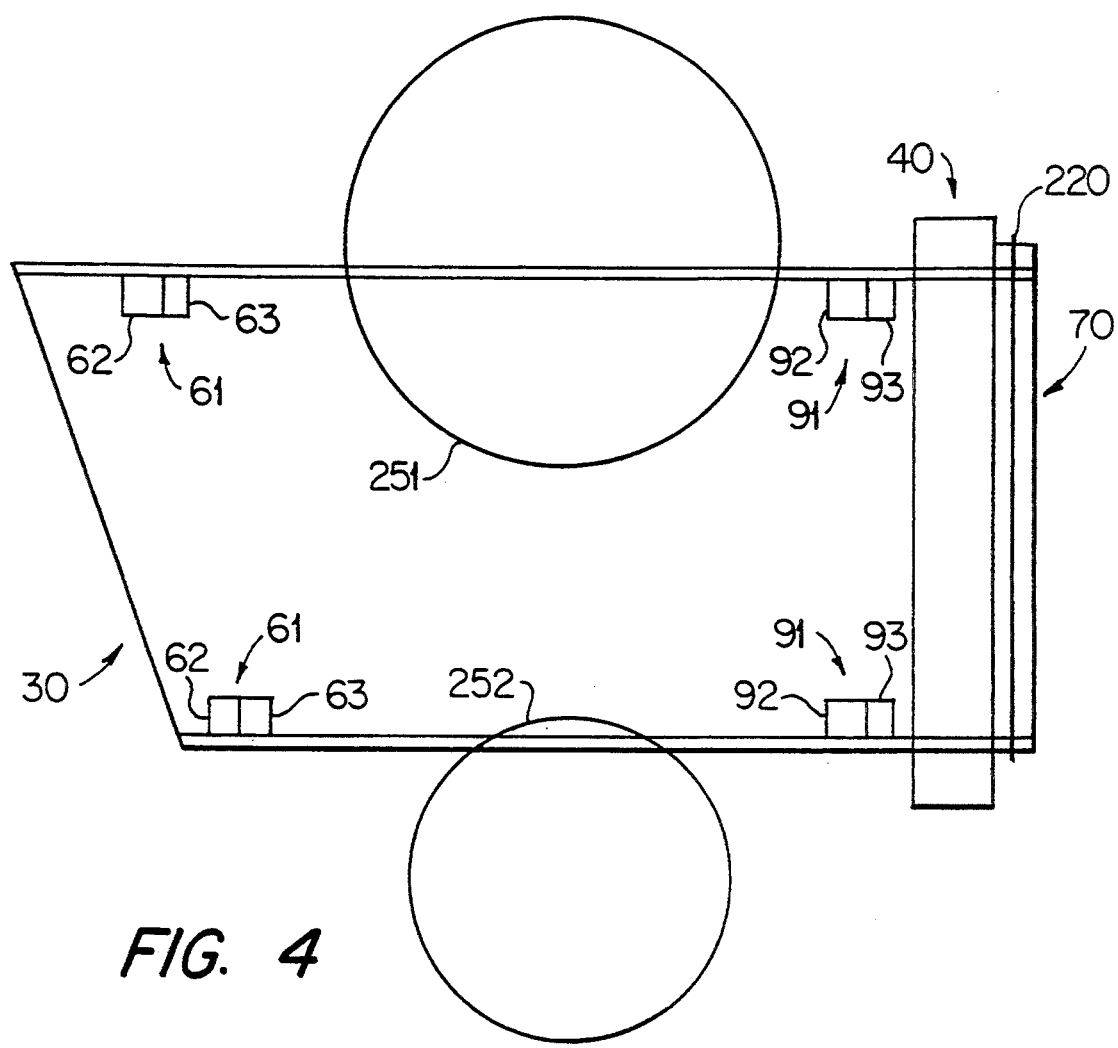
FIG. 4 is a side view of the insert port of the preferred collection system.

FIG. 4 shows intake mechanism 50 in more detail including entry port detectors 61 and iris detectors 91. When an object is at entry port 30, an infrared light beam emitted by emitter 62 reflects off the object and the reflected light is received by receiver 63. Similarly, when an object is at iris 40, an infrared beam emitted by emitter 92 reflects off the object and is received by receiver 93. In response to signals from receivers 63 or 93, CPU 635 opens iris 40 and activates intake mechanism 50 to propel the article through iris 40. As shown in FIG. 4, intake mechanism 50 includes rollers 251 and 252.

As the article travels into the interior of RVM 11, the article passes through electrified coil 220. Electrified coil 220 senses whether the article has a metallic property, as discussed in more detail below.

Figure 5:
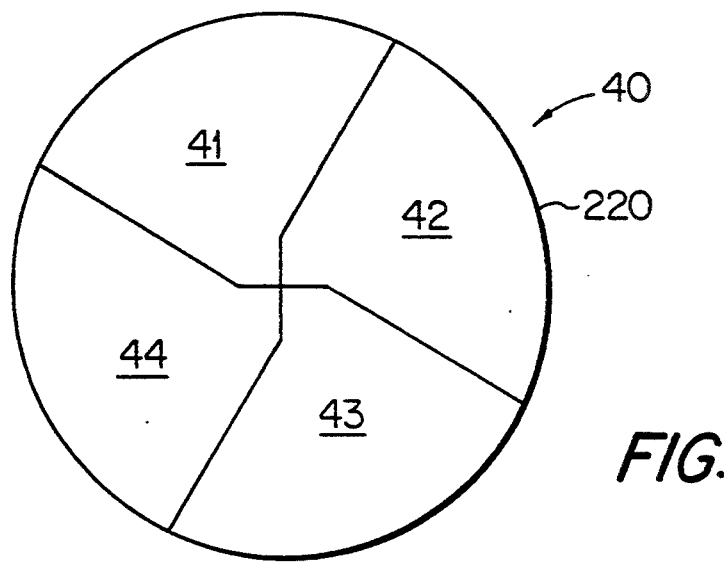
FIG. 5 is a plan view of a portion of the insert port shown in FIG. 4.

As shown in FIG. 5, iris 40 includes a plurality of movable plates 41–44. A solenoid switch (not shown) opens plates 41–44 against the force of a spring (not shown) to allow an inserted article to pass into the interior of RVM 11. Once the article passes through iris 40, the solenoid switch is turned off. Plates 41–44 thus return to the closed position of FIG. 4 by the spring force.

Figure 6:
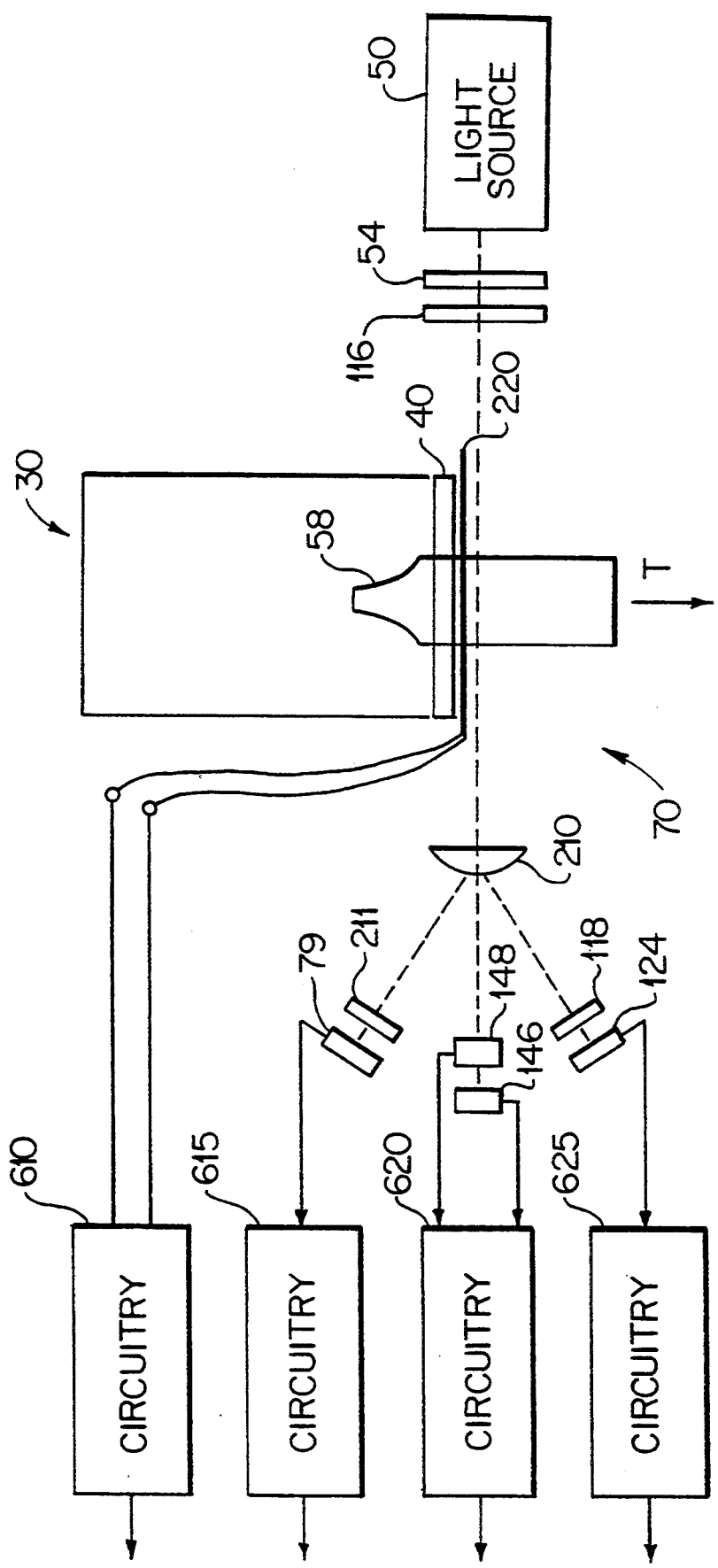
FIG. 6 is a schematic diagram showing circuitry for analyzing inserted articles in the preferred collection system.

FIG. 6 shows signal paths within sensing stations 70. A beam of light emanates from light source 50 and propagates through travelling article 58. Light source 50 may be, for example, a halogen lamp. If a halogen lamp is employed, an infrared filter 54 is disposed in front of the halogen lamp. Infrared filter 54 is required in such instances to prevent infrared light emanating from a light source such as a halogen lamp from falling incident on the detectors, described below, and rendering erroneous readings.

Defocusing device 210 may be a lens, a diffraction grating, or a holographic optical element. Defocusing device 210 spreads the beam of light to illuminate detectors 124, 146, 148 and 79.

Circuitry 625 detects whether the article contains PET, based on the fact that PET rotates light about 35° to 40° whereas other materials, such as vinyl, do not. Cross polarizer 118 has a polarizing direction cross to that of polarizer 116. Consequently, when no container is present, no light will be transmitted from the source through cross polarizer 118. If a container 58 made of PET is introduced between the two polarizers, however, light passing through the container 58 will be rotated to allow it to pass through cross polarizer 118 and be detected at detector 124.

Figure 7:
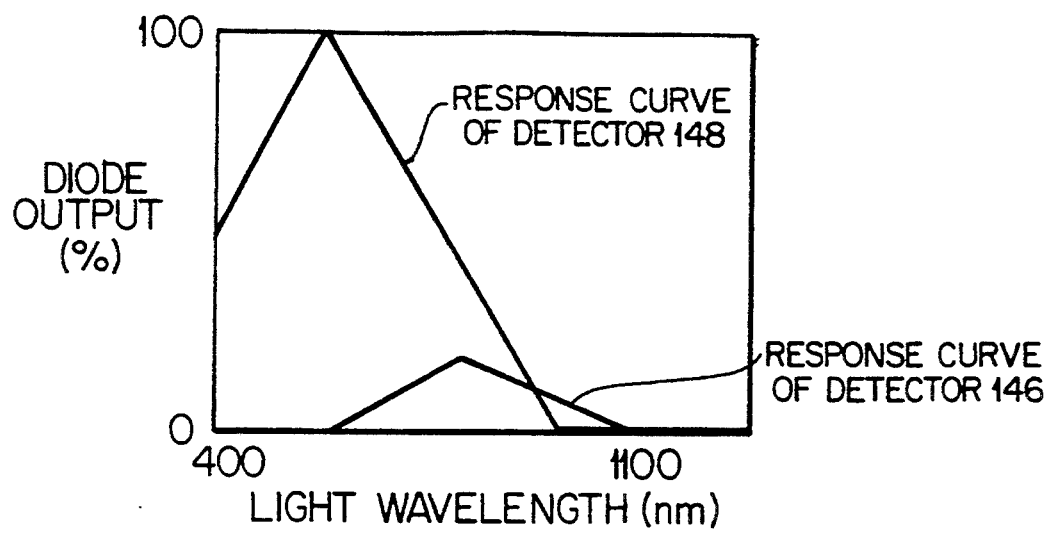
FIG. 7 is a plot of response curves of photodetectors shown in FIG. 6.

Circuitry 620 detects the color of the article based on signals from detectors 146 and 148. Detector 146 is behind detector 148 to intercept light passing through detector 148. Detectors 146 and 148 are vertically incorporated into one chip with detector 148 acting as an optical filter with respect to the detector 146. Detectors 148 and 146 each include a photodiode. As shown in FIG. 7, light of a relatively short wavelength is absorbed by detector 148 while light of a relatively long wavelength will penetrate to detector 146. Thus, the first detector 148 is more responsive to short wavelengths of light whereas second detector 146 is more responsive to longer wavelengths of light. Preferably, detectors 146 and 148 are implemented by a model PD150 color sensor available from Sharp Corporation.

Circuitry 615 amplifies a signal from detector 79 to indicate the intensity of light propagating through container 58. Polarizing filter 211 is a plain polarizing filter, oriented parallel to the direction of polarization of light passing through filter 116. Because of polarizing filter 211 in front of detector 79, not only does circuitry 615 indicate intensity, but also the signal from circuitry 615 can be compared with the signal from circuitry 625 to determine whether article 58 contains an imperfection or contaminant, as described in U.S. patent application Ser. No. 08/144,030 filed Nov. 1, 1993, for APPARATUS AND METHOD FOR DETECTION OF MATERIAL USED IN CONSTRUCTION OF CONTAINERS AND COLOR OF SAME, by Ken Powell and Rusty Driscoll, owned by applicant's assignee. The disclosure of application Ser. No. 08/144,030 is herein incorporated by reference.

Circuitry 610 and coil 220 constitute a device for discriminating metal in article 58. Circuitry 610 senses variations in self-inductance of coil 220 as article 58 passes through coil 220, as described in U.S. Pat. No. 5,028,870 filed Apr. 18, 1989 and issued Jul. 2, 1991, for SENSOR SYSTEM METHOD AND APPARATUS FOR DISCRIMINATION OF METALLIC OBJECTS BASED ON A VARIATION IN SELF-INDUCTANCE, by Michael A. Reed, owned by applicant's assignee. The disclosure of U.S. Pat. No. 5,028,870 is herein incorporated by reference. Circuitry 610 is configured to generate a base line signal of approximately 2.5 V when no metal is present, a signal of at least 0.6 V under this base line when aluminum is present, and a signal of at least 0.4 V over this base line when steel is present.

Figure 8:
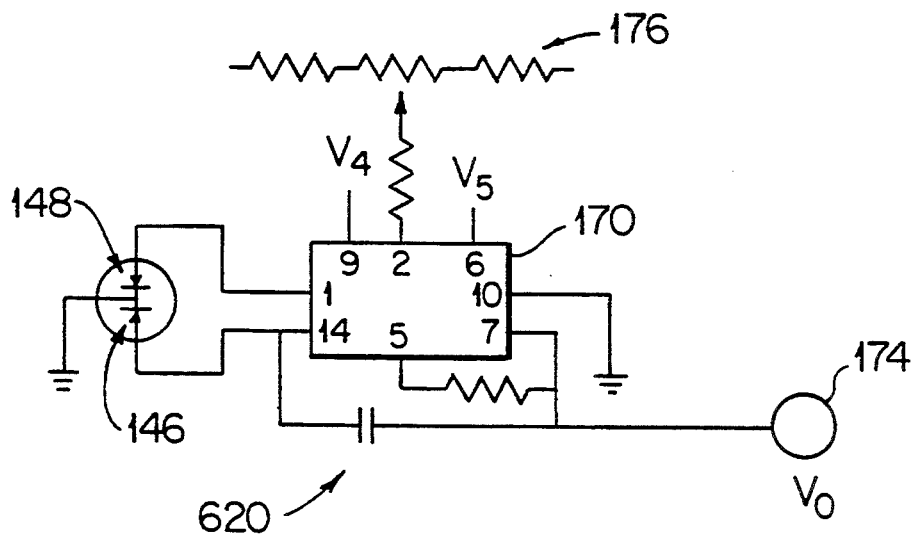
FIG. 8 is a schematic diagram of a circuit shown in FIG. 6 in more detail.

FIG. 8 shows circuitry 620 in more detail. Detectors 146 and 148 are connected to an integrated circuit 170. Integrated circuit 170 is preferably a model LOG 100 JP log amp manufactured by Burr Brown. Each of the short circuit currents $I_{sc1}$ and $I_{sc2}$ obtained from photodiodes 146 and 148, respectively, is logarithmically compressed and goes through a subtraction circuit in integrated circuit 170 to produce a reduced output voltage. The reduced output voltage from integrated circuit 170 is adjustable for wavelengths in the range 400 to 700 nm through adjustable resistor 176 to provide an output voltage of $-12$ to $+12$ VDC over a wavelength range of 400 to 700 nm. Integrated circuit 170 is supplied with a voltage through a voltage source to provide a voltage at $V_4$ preferably $-12$ VDC and a voltage at $V_5$ of preferably $+12$ VDC. Thus, circuitry 620 generates a signal $V_o$ as follows:

$V_o = \log I_{sc1} - \log I_{sc2} = \log(I_{sc1}/I_{sc2})$; where $I_{sc1}$ = the short circuit current of the first detector; and $I_{sc2}$ = the short circuit current of the second detector.

The voltages at output port 174 are preferably clipped to 0 to 5 VDC. The voltage at output port 174 when no container is present is adjusted to 2.5 VDC.

Figure 9:
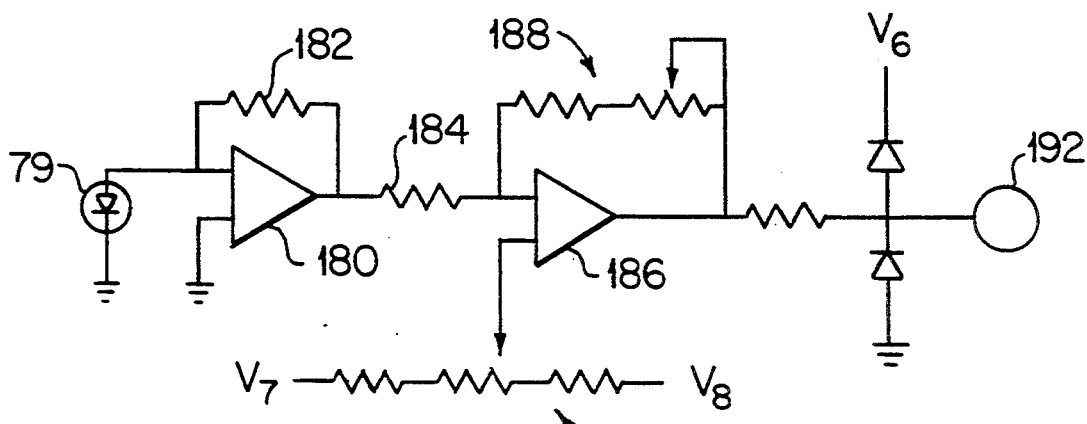
FIG. 9 is a schematic diagram of another circuit shown in FIG. 6 in more detail.

FIG. 9 shows circuitry 615 in more detail. Detector 79, a photodiode, is connected across the inputs of operational amplifier 180. Operational amplifier 180 has a 120 k-ohm feedback resistor 182. The output of operational amplifier 180 is coupled through a resistor 184 to the input of another operational amplifier 186. The value of feedback resistor 190 is adjustable to provide an output voltage at output port 192 of 0 to 5 VDC given an output from photodiode 79 of 0.0 to 4,000 nA and an output from operational amplifier 180 from 0.0 to 0.9 VDC.

Figure 10:
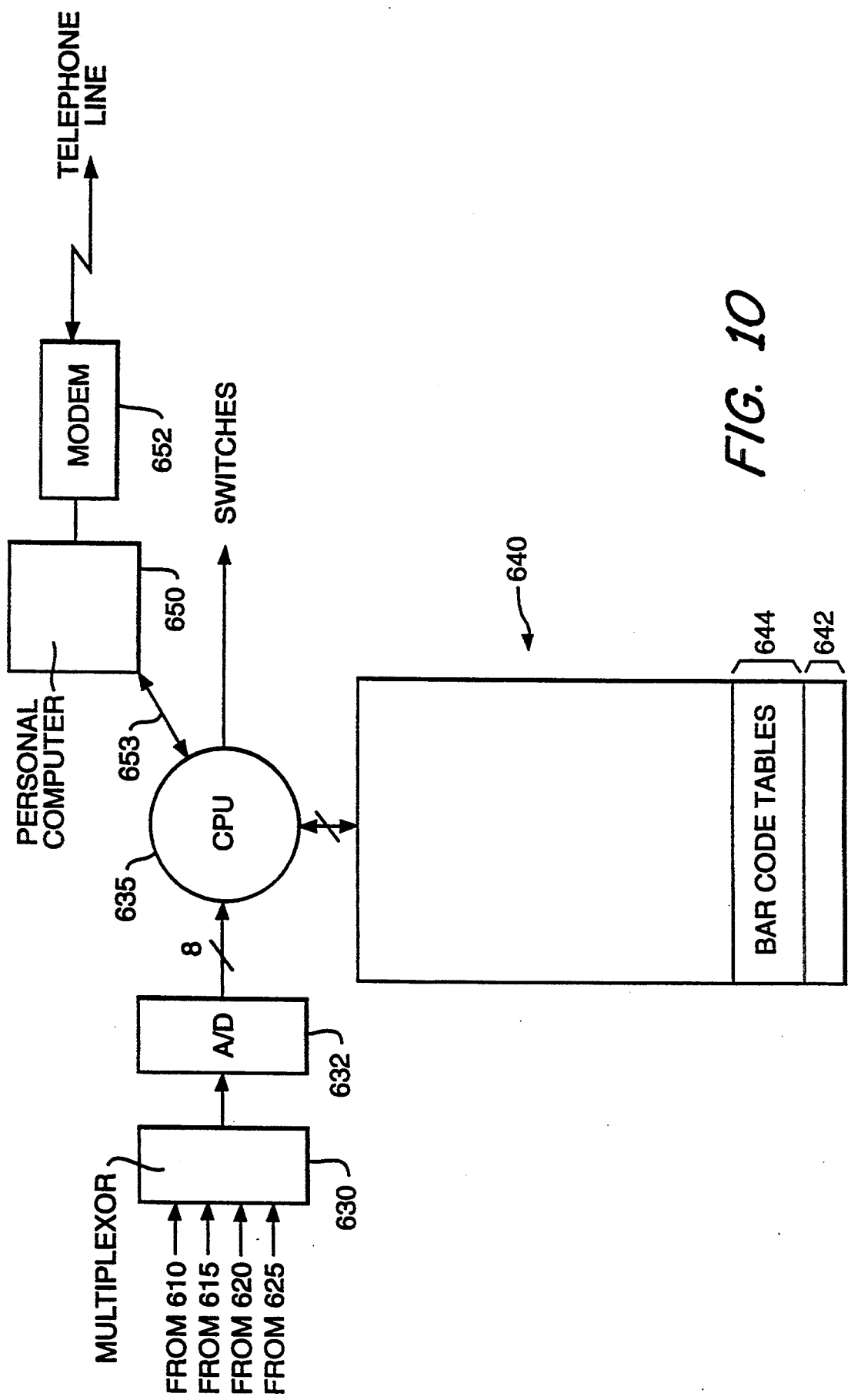
FIG. 10 is a schematic diagram showing the control processor of the preferred collection system.

FIG. 10 shows an overview of some of the control hardware of RVM 11. Central processing unit (CPU) 635, which is an Intel 80C188, executes instructions stored in one megabyte memory 640. In addition to executable instructions, memory 640 includes various data such as bar code tables 644. Memory area 642 is a nonvolatile, read-only, area containing a boot program.

The signal lines shown in FIG. 10 show data flow paths in RVM 11, but do not necessarily show actual circuit connections. CPU 635 communicates with multiplexor 630 and A/D convertor 632 through a data bus and conventional Intel 80C188 input/output instructions. Multiplexor 630 generates an output signal corresponding to the signal generated by one of circuitry 610, circuitry 615, circuitry 620 or circuitry 625. A/D convertor converts the analog output signal generated by multiplexor 630, and generates a conversion—complete interrupt to interrupt CPU 635 at the completion of a conversion operation.

CPU 635 communicates with IBM compatible personal computer 650 by way of serial link 653. Personal computer 650 can detect when RVM 11 requires maintenance, and indicate that maintenance is required by placing a telephone call through modem 652. Personal computer 650 also accepts telephone calls and, in conjunction with CPU 635 and down-load program in memory area 642, can update the bar code tables, or the executable instructions, in memory 640.

A "bar code" is a number recorded as a machine-readable set of stripes on the surface of a product. An organization called the Universal Code Counsel allocates a particular number to a particular product. Thus, a certain product, having a certain composition and color, distributed by a certain manufacturer has a unique number. For example, a ginger-ale product distributed by the "Acme" company in a green PET container might have the bar code stripes for the number 4323456789 printed on the container. Thus, a genuine returnable container can be classified and sorted according to the bar code read by a bar code reader.

Memory area 644 includes a list of acceptable metal can bar codes in numerical order. Each bar code is a 10 digit ASCII field left justified and padded with ASCII 'F' to the right.

TABLE 1

| |
|---|
| 112345FFFF,v,t,o |
| 123456FFFF,v,t,o |
| 21234FFFFF,v,t,o |
| 312345FFFF,v,t,o |
| 4123456789,v,t,o |

Where:

v=refund amount (0 to 3), (another table defines these values)

t=article type to be compared with sensing station 70 result, defines as:
  ALUM CAN=0
  STEEL CAN=1
o=option byte, each bit defines a different option:
  bit 0=color sensor data isn't required to match the bar code type for acceptance.

Memory area 644 also includes a list of acceptable glass bar codes in numerical order:

TABLE 2

122345FFFF,v,t,o
133456FFFF,v,t,o
22234FFFFF,v,t,o
322345FFFF,v,t,o
4223456789,v,t,o

Where:
v=refund amount (0 to 3), (another table defines these values)

t=article type to be compared with sensing station 70 result:
  CLEAR GLASS=4
  GREEN GLASS=5
  AMBER GLASS=6
o=option byte, each bit defines a different option:
  bit 0=color sensor data isn't required to match the bar code type for acceptance.

Memory 644 also includes a list of acceptable PET bar codes in numerical order:

TABLE 3

132345FFFF,v,t,o
143456FFFF,v,t,o
23234FFFFF,v,t,o
332345FFFF,v,t,o
4323456789,v,t,o

Where:
v=refund amount (0 to 3), (another table defines these values)

t=article type to be compared with sensing station 70 result:
  GREEN PET=2
  CLEAR PET=3
o=option byte, each bit defines a different option:
  bit 0=color sensor data isn't required to match the bar code type for acceptance.

Figure 11:
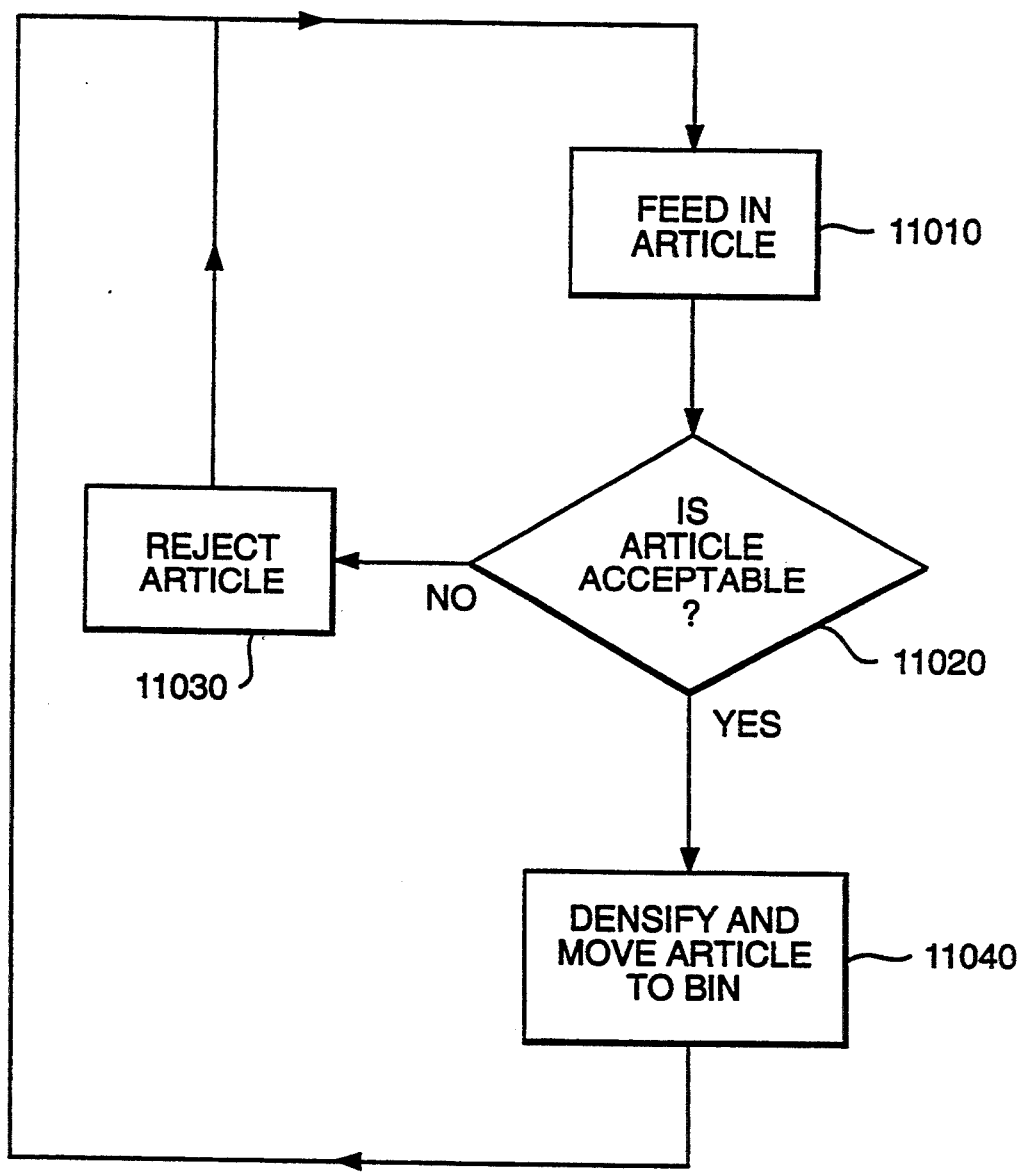
FIG. 11 is a flow chart illustrating an operation performed by the preferred collection system.

FIG. 11 shows a processing performed by the preferred collecting system. When a consumer puts an article through port 30, RVM 11 feeds the article into the interior of RVM 11 (step 11010), determines if the article is acceptable (step 11020), and densifies and moves the densified article to an appropriate bin if the article is acceptable (step 11040). If the article is not acceptable, RVM 11 rejects the article through reject chute 32 (step 11030).

Figure 12:
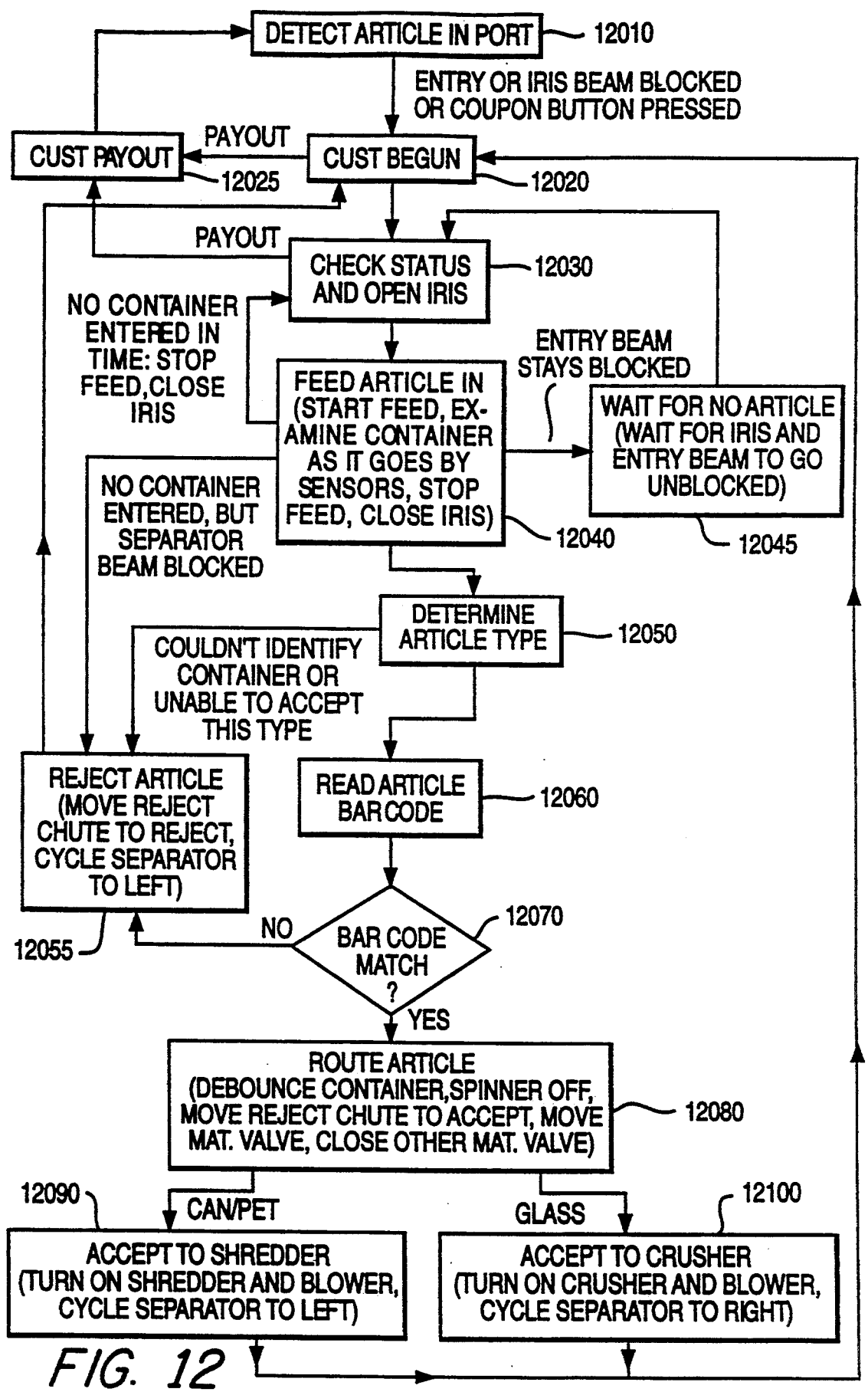
FIG. 12 is a flow chart illustrating the processing operation shown in FIG. 11 in more detail.

FIG. 12 shows the processing of the preferred collection system in more detail. Step 11010 of FIG. 11 corresponds to steps 12010, 12020, 12030, 12040 and 12045 of FIG. 12. Step 11020 of FIG. 11 corresponds to steps 12050, 12060 and 12070 of FIG. 12. Step 11040 of FIG. 11 corresponds to steps 12080, 12090, 12100 and 12025 Of FIG. 12.

The consumer first chooses the type of token to be issued as payment mechanism by, for example, pressing a button corresponding to cash or coupon receipt. The consumer then inserts the first article into insert port 30, and RVM 11 detects the article (step 12010). After checking whether the customer should be paid (step 12020), and after checking whether the system is prepared to feed the article in, RVM 11 opens the iris (step 12030). CPU 635 then feeds the article in by rotating rollers 251 and 253 and belt 54 of intake device 50 (step 12040). If the article does not move through iris 40, the consumer is instructed to remove the article and RVM 11 waits for the container to be removed (step 12045).

RVM 11 then senses the color and composition of the inserted article (step 12050). Objects having an unacceptable composition are rejected and returned to the consumer via the reject port 32 (step 12055). Laser scanner 97 scans the inserted article for a bar code (step 12060). CPU 635 determines whether the bar code read in step 12060 is in one of the bar code tables described above, and whether the article type determined in step 12050 matches the article type of the bar code (step 12070). If no such match occurs, the article is rejected (step 12055). In other words, in steps 12050, 12060, and 12070, CPU 635 determines a physical attribute of the container, and determines whether the physical attribute corresponds to the read bar code (step 12070).

For example, if CPU 635 determines that the article is green PET (step 12050), CPU 635 searches Table 3, described above, for the bar code read in step 12060. If the read bar code is not in Table 3, CPU 635 rejects the article in step 12055. Further if the bar code is in Table 3, but the "t" field for the bar code's entry is not equal to 2, meaning green, CPU 635 rejects the article in step 12055. (step 12070)

If CPU 635 determines that the article is an aluminum can (step 12050), CPU 635 searches Table 1, described above, for the bar code read in step 12060. If the read bar code is not in Table 1, CPU 635 rejects the article in step 12055. Further if the bar code is in Table 1, but the "t" field for the bar code's entry is not equal to 0, meaning aluminum, CPU 635 rejects the article in step 12055. (step 12070)

If CPU 635 determines that the article is an amber glass (step 12050), CPU 635 searches Table 2, described above, for the bar code read in step 12060. If the read bar code is not in Table 2, CPU 635 rejects the article in step 12055. Further if the bar code is in Table 2, but the "t" field for the bar code's entry is not equal to 6, meaning amber, CPU 635 rejects the article in step 12055. (step 12070)

Thus the processing of step 12070 determines whether the detected composition and color of the article corresponds to the bar code read from the article.

Step 12070 is performed because, although a genuine article can be classified by composition and color based on the read bar code, a dishonest person might attempt to deceive such a classification scheme by making copies of a bar code for an article accepted by a particular collection system, and pasting a copy of the bar code onto an article that is not acceptable. Thus, the preferred collection system both analyzes the physical attributes of the article and compares the results of the analysis to data stored for the bar code.

Although the illustrated bar code tables record color and composition data for each acceptable bar code, the tables could record additional physical attributes for each bar code, such as the weight of the corresponding article.

A separation wheel then routes the inserted article (step 12080). Plastic and aluminum articles are sent to the shredding mechanism 111 for densification (step 12090), and glass articles are sent to the crushing mechanism 112 for densification (step 12100). First and second chutes 122, 123 transfer the densified articles to the proper inlet pipe 126a–f to send the densified article to the storage bins 13, 14 and 15.

When the densified article reaches the inlet pipe 126a–f, a blower is activated thereby transferring the densified article to the storage bins 13, 14 and 15.

The consumer may push a button to receive payment for the inserted articles or the consumer may insert another article into the insert port 30 (step 12020).

Figure 13A:
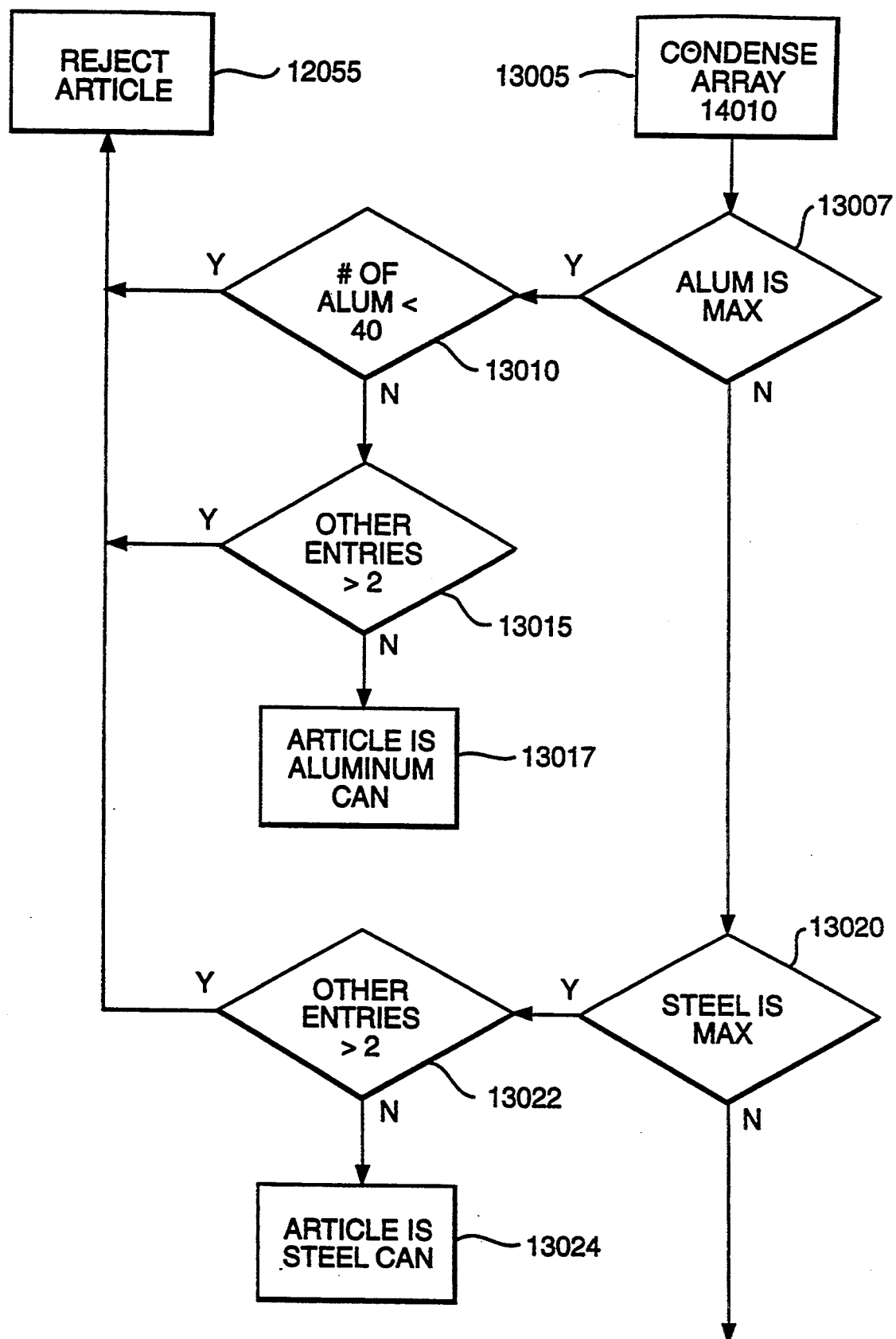
FIG. 13A-C are flow charts illustrating the processing operation of a step shown in FIG. 12 in more detail.
Figure 13B:
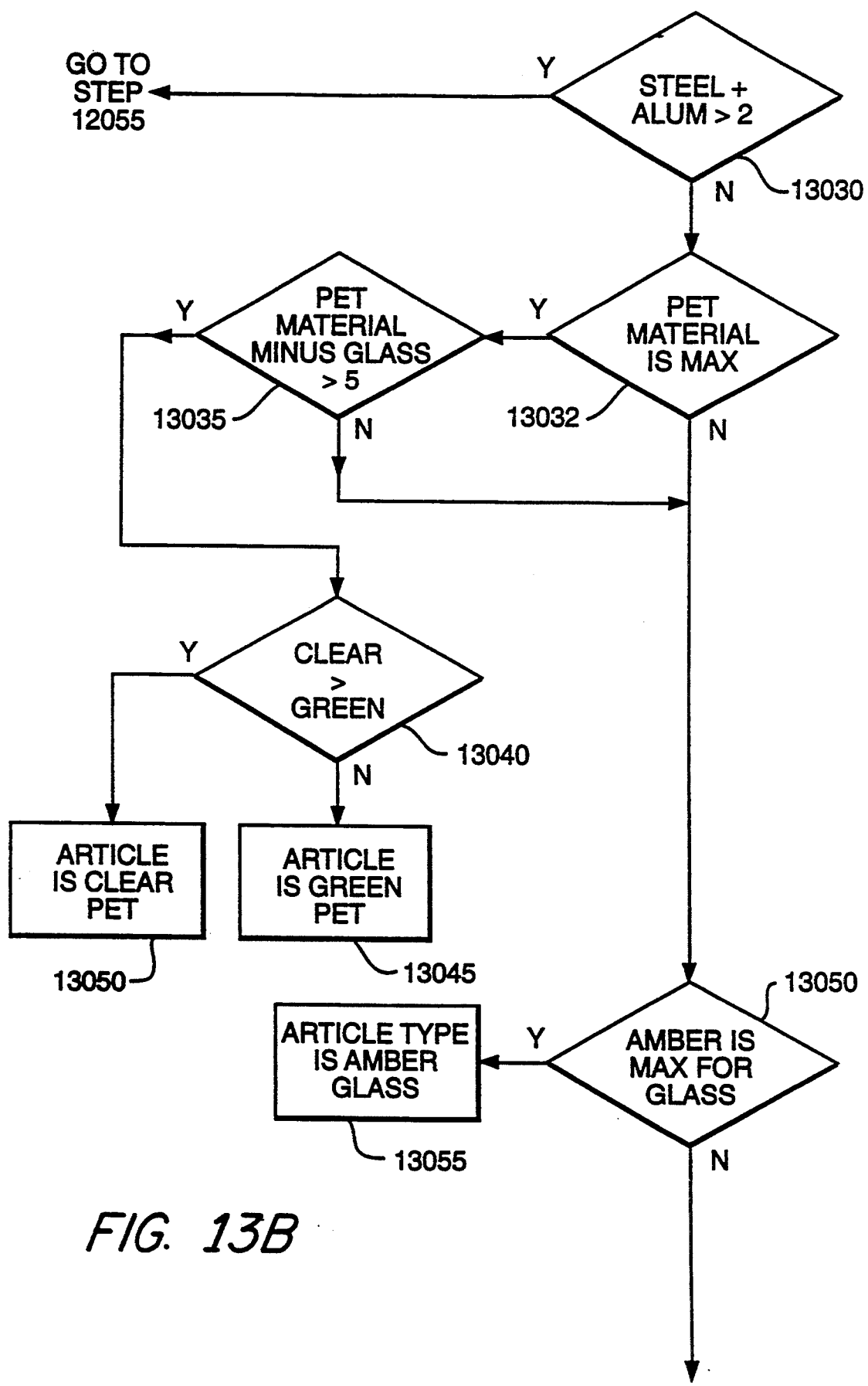
Figure 13C:
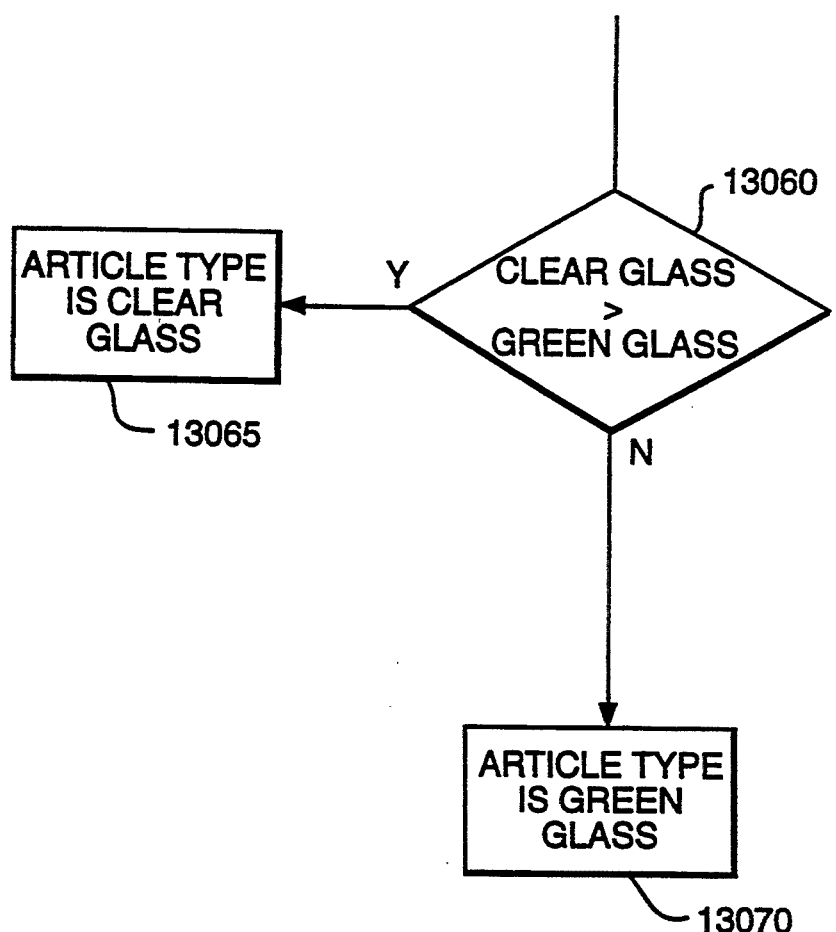

FIG. 13 shows step 12050 of FIG. 12, the step of determining an article type, in more detail. Before describing the steps shown in FIG. 13, some interrupt processing of RVM 11 will be described. Memory 640 includes an interrupt routine that is executed when A/D convertor 632 generates a conversion—complete interrupt, indicating that a conversion operation has completed. Normally, when an article is not being fed into RVM 11, the interrupt routine reads a digitized value, corresponding to the analogue signal from circuitry 615, from A/D converter 632. This digitized value will be a base line value corresponding to no article blocking the optical path between light source 50 and detector 79. The interrupt routine then causes A/D converter 632 to begin the conversion of another value, and the interrupt routine then terminates.

When an article passes through sensing station 70, the article will block the optical path between light source 50 and detector 79, causing the interrupt routine to read a relatively low value, less than the base-line value, from A/D converter 632. In response to reading this low value, the interrupt routine sets a variable indicating that an article is passing through sensing station 70. In other words, the interrupt routine compares the value read from A/D converter 632 with a threshold, and conditionally sets a variable based on whether the read value is below the threshold.

Based on this variable, the interrupt routine conditionally executes instructions to store the digitized value read from A/D convertor 632 into an array, and increment an array index. In this storing mode, CPU 635 changes the selected input of multiplexor 630 before causing A/D converter 632 to being another conversion operation. Thus, every four executions of the interrupt routine, A/D convertor 632 will digitize a signal from circuitry 610. Similarly, A/D convertor 632 will digitize a signal from circuitry 615 every four executions, will digitize a signal from circuitry 620 every four executions, and will digitize a signal from circuitry 625 every four executions. In other words, if multiplexor 630 is set to select the signal from circuitry 610 upon the beginning of execution of the interrupt routine, before terminating execution, the interrupt routine will set the control input of multiplexor 630 to select the signal from circuitry 615. If multiplexor 630 is set to select the signal from circuitry 615 upon the beginning of execution of the interrupt routine, before terminating execution, the interrupt routine will set the control input of multiplexor 630 to select the signal from circuitry 620. If multiplexor 630 is set to select the signal from circuitry 620 upon beginning of execution, the interrupt routine will set the control input of multiplexor 630 to select the signal from circuitry 625. If multiplexor 630 is set to select the signal from circuitry 625 upon beginning of execution, the interrupt routine will set the control input of multiplexor 630 to select the signal from circuitry 610.

At the time of setting the variable indicating that an article is moving through sensing station 70, CPU 635 disables some other interrupt processing to reduce the period between invocations of the interrupt routine. The period between invocations is determined by the amount of time it takes to execute the interrupt routine, and the conversion time of A/D converter 632. The conversion time of A/D converter 632 is approximately 100 microseconds. Thus, at least one set of four values is stored every millisecond and, even though article 58 completely passes through sensing station 70 in less than 1 second, approximately 100 sets of values, or more, are stored during the passage of article 58 through sensing station 70.

Thus, CPU 635 begins to save physical attribute information about the article when sensor 79 detects a reduction in light intensity. CPU 635 saves a set of four values, each corresponding to a portion of the article. CPU 635, however, does not store a set of values when the intensity data, corresponding to the signal from circuitry 615, is at base line intensity. In other words, when base line intensity is present, the array index is not incremented. Further, if 100 consecutive digitized values from circuitry 615 are at base line intensity, the data storing mode terminates, based on the assumption that article 58 is no longer passing through sensing station 70 and is in the interior of RVM 11.

After the data storing mode terminates, memory 644 contains a 4×T array 14010, as shown in FIG. 14. CPU 635 then examines each set of 4 values and determines whether to translate the set into an article type, or to discard the set. (step 13005) If the color value of a set, corresponding to a digitized value from circuitry 620, indicates clear, then the intensity value of the set is compared with a threshold and the set is discarded if the intensity is less than the threshold.

Thus, in the data storing mode CPU 635 discards a set of values when the intensity value is greater than a threshold, and in the data condensing operation of step 13005, CPU 635 discards a set when the color is clear and the intensity is less than a second threshold. In other words, CPU 635 performs a first comparing step of comparing an intensity of the set of values to a first threshold, selectively discards the set of values based on a result of the first comparing step, selects a second threshold based on a color of the set of values, performs a second comparing step of comparing the intensity of the set to the second threshold, and selectively discards the set based on a result of the second comparing step.

CPU 635 compares the intensity with the second threshold when the color is clear because many non-returnable items such as wood, paper, and Styrofoam cups, can be distinguished from a returnable glass bottle by such a comparison.

CPU 635 also discards a set when the metallic value indicates a metallic object and the intensity value is above a certain threshold, based on the assumption that a metallic object should be opaque. In other words, CPU 635 selects a threshold based on a metallic property of a portion of array 14010, performs a comparing step of comparing the intensity of the portion of the array 14010 to the threshold, and selectively discards the portion of array 14010 based on a result of this comparing step.

If CPU 635 does not discard a particular set, CPU 635 translates the set into a single value corresponding to one or more a types. CPU 635 performs the translation by comparing the values of the set to various thresholds. First, CPU 635 sets an entry in array 15010, shown in FIG. 15, to aluminum can if the metallic value of the set is 0.6 volts below base line, or sets the type to steel can if the metallic value is 0.4 volts over base line.

If the type is neither steel nor glass, CPU 635 determines a color subtype to be green if the color value is greater than 4.5 volts, determines the color subtype to be amber if the color value is less than 0.5 volts, and determines the color subtype to be clear otherwise.

CPU 635 also determines a composition subtype to be PET if the value of polarization is greater than 4 volts, and determines the composition subtype to be PET-or-glass otherwise. The reason for the PET-or-glass subtype is that a PET article passing through sensing station 70 will typically allow some of the light to pass through unpolarized, while a glass article will typically not polarize any of the light.

Based on the subtypes described above, CPU 635 then sets an array 15010 entry to one of clear PET, green PET, clear PET-or-glass, green PET-or-glass, or amber PET-or-glass.

Thus the processing of step 13005 translates 4×T array 14010, as shown in FIG. 14, into a 1×P type array, as shown in FIG. 15, wherein each of the P entries contains a type value indicating either aluminum, steel, clear PET, green PET, clear PET-or-glass, green PET-or-glass, or amber PET-or-glass.

Thus, array 14010 corresponds to a first signal having T portions each corresponding to a respective portion of the article, and CPU 635 processes each portion by comparing an intensity value of the portion to one or more thresholds, and either selectively discards the portion based on a result of the comparing step, or translates the portion into entry in array 15010. Typically, array 14010 will have at least 100 entries after the data storing mode terminates, and array 15010 will have at least 40 entries after step 13005 terminates.

CPU 635 then analyzes array 15010 to determine the type of the article. CPU 635 determines which type corresponds to the maximum number (M) of entries in array 15010. In other words CPU 635 determines which type corresponds to more entries than any other type. The number of entries corresponding to this type is M.

CPU 635 then determines a first value based on M, determines a second value based on the type having the maximum number of entries, and compares the first value to the second value. More specifically, if aluminum corresponds to the maximum number of entries (step 13007), CPU 635 determines whether the number of aluminum entries (M) is less than 40 (step 13010). Thus, in step 13010, the first value is determined to be M, and the second value is determined to be 40. Essentially, CPU 635 selects 40 as the second value because aluminum has the maximum number of entries.

If the number of aluminum entries is less than 40, the article is rejected (step 12055), based upon the assumption that an actual aluminum can would have a length sufficient to generate more than 40 entries. If the number of entries of another material are greater than 2, CPU 635 rejects the article (step 13015). CPU 635 implements step 13015 by subtracting the aluminum entries (M) from the total number of entries (P), and comparing the result to the number 2. Thus, in step 13015, another first value based on M is determined to be M minus P, and another second value based on type is determined to be 2. Essentially, CPU 635 selects 2 as the second value because aluminum corresponds to the maximum number of entries.

If the number of other entries is not greater than 2, the type of the article is determined to be aluminum (step 13017).

CPU 635 determines the article to be steel when steel corresponds to the maximum number of the entries and the number of other entries is not greater than 2 (steps 13020, 13022, and 13024).

CPU 635 then rejects the article if the number of steel and aluminum entries is greater than 2 (step 13030), based on an assumption that a glass or a PET container should not have a metallic property.

CPU 635 determines if PET material corresponds to the maximum number of entries. In table 15010 of FIG. 15, the number of entries corresponding to PET material is the sum of the number of entries having values of either clear PET, green PET, clear PET-or-glass, green PET-or-glass, or amber PET-or-glass. (step 13032).

If PET material corresponds to the maximum number of entries, CPU 635 determines if the number of entries corresponding to PET material minus the number of entries corresponding to glass is greater than 5. (step 13035). CPU 635 implements step 13035 by comparing 5 to the sum of the number of entries in table 15010 having values of either clear PET or green PET.

Thus, in step 13035, the first value is determined to be M minus the number of entries corresponding to glass, and the second value is determined to be 5. Essentially, CPU 635 selects 5 as the second value because PET material corresponds to the maximum number of entries.

The article type is either clear PET or green PET depending on whether the number of clear PET entries is greater than the number of green PET entries (steps 13040, 13045 and 13050).

If amber PET-or-glass corresponds to the maximum number of glass entries, the article type is amber glass (steps 13050 and 13055). Finally, the article type is declared to be either clear glass or green glass depending on whether the number of clear glass entries is greater than the number of green glass entries (steps 13060, 13065, and 13070).

CPU 635 and the program stored in memory 640 implement the steps shown in FIG. 12 as software states corresponding to each step. There is a one bit flag for each state, and the software may be in multiple states concurrently.

The software includes a continuous loop containing a routine for each state. Each state routine is conditionally executed depending upon whether the corresponding bit flag is set.

The advantage of having multiple states concurrently active is that some states correspond to a task involving waiting for an event, such as a signal from an input/output device, and such a waiting operation can be overlapped with another operation performed by another active state. A particular state routine implements this overlapping by setting a sub-state variable, unique to the particular state routine, indicating which part of the state's task to perform next and then exiting the routine, allowing control to pass to another state routine. When the particular state routine is again invoked, the sub-state variable for the routine controls where in the routine execution is to recommence.

Thus the collection system of the present invention automatically classifies articles.

Although RVM 11 initiates the saving of physical attribute data by incrementing an array index, the physical attribute data could be constantly written into a circular array, with the array index being unconditionally incremented. With this alternative scheme, the array index at the time of drop in light intensity is latched to effectively initiate the saving of physical attribute data by indicating where in the array valid data begins.

Although RVM 11 determines article color by passing light through the article, opaque articles may be classified by measuring the light reflected off of the article.

Other embodiments of the invention will be apparent to those skilled in the art from consideration of the specification and practice of the invention disclosed herein. It is intended that the specification be considered as exemplary only, with a true scope and spirit being indicated by the following claims.

What is claimed is:

1. A method of processing collected articles, the method comprising the steps of:
   determining a physical attribute of a collected article;
   reading a code on the collected article;
   determining whether the physical attribute corresponds to the code;
   selectively routing the article through a first path when the physical attribute corresponds to the code; and
   routing the article through a second path, different from the first path when the physical attribute does not correspond to the code.

2. The method of claim 1 wherein the determining step includes the substep of determining a color of the article.

3. The method of claim 2 wherein the reading step includes the substep of reading a bar code on the article.

4. The method of claim 1 wherein the determining step includes the substep of determining whether the article includes a substantial amount of metal.

5. The method of claim 4 wherein the reading step includes the substep of reading a bar code on the article.

6. The method of claim 1 wherein the determining step includes the substep of determining whether the article includes a substantial amount of aluminum.

7. The method of claim 6 wherein the reading step includes the substep of reading a bar code on the article.

8. The method of claim 1 wherein the determining step includes the substep of determining whether the article includes a substantial amount of steel.

9. The method of claim 8 wherein the reading step includes the substep of reading a bar code on the article.

10. The method of claim 1 wherein the determining step includes the substep of determining whether the article includes a substantial amount of a light-polarizing substance.

11. The method of claim 10 wherein the reading step includes the substep of reading a bar code on the article.

12. The method of claim 1 wherein the determining step includes the substep of determining whether the article includes a substantial amount of PET.

13. The method of claim 12 wherein the reading step includes the substep of reading a bar code on the article.

14. The method of claim 1 wherein the determining step includes the substep of directing electromagnetic radiation at the article.

15. The method of claim 14 wherein the reading step includes the substep of reading a bar code on the article.

16. The method of claim 1 wherein the reading step includes the substep of reading a bar code on the article.

17. An article collection assembly, comprising:
    a housing having a port for receiving an article;
    means for determining a physical attribute of a received article;
    means for reading a code on the received article;
    means for determining whether the physical attribute corresponds to the code; and
    means for selectively routing the article through a first path when the physical attribute corresponds to the code and otherwise, routing the article through a second path, different from the first path.

18. A method of sorting articles, the method comprising the steps of:
    illuminating the article;
    receiving light from the article;
    generating a signal corresponding to light received from P portions of the article, where P is an integer;
    analyzing the signal to determine, for each portion of the article, a physical attribute corresponding to the portion;
    determining the physical attribute corresponding to the maximum number (M) of portions, where M is an integer;
    determining a first value based on M;
    determining a second value based on the determined physical attribute;
    a first comparing step of comparing the first value to the second value;
    selectively routing the article through a first path based on the result of the comparing step; and
    otherwise, routing the article through a second path, different from the first path.

19. The method of claim 18 wherein the step of determining a first value includes the substep of
    determining the first value to be equal to M, and the step of selectively routing includes the substep of
    selectively routing the article when M is less than the second value.

20. The method of claim 19 wherein P is greater than 40.

21. The method of claim 20 wherein T is greater than 100.

22. The method of claim 18 wherein the step of determining a first value includes the substep of
    subtracting M from P.

23. The method claim 20 wherein P is greater than 40.

24. The method of claim 23 wherein T is greater than 100.

25. The method of claim 18 wherein the step of generating a signal includes the substep of
    generating the signal by sensing a metallic property of each of the P portions of the article.

26. The method of claim 26 wherein P is greater than 40.

27. The method of claim wherein T is greater than 100.

28. The method of claim 18 wherein the step of generating a signal includes the substep of:
    generating a first signal having T portions each corresponding to a respective portion of the article, wherein T is an integer greater than P; and the substeps, performed for each of the T portions of the first signal, of a second comparing step of comparing an intensity of the portion of the first signal to a threshold value; and selectively discarding the portion of the first signal based on a result of the second comparing step.

29. The method of claim 28 wherein P is greater than 40.

30. The method of claim 29 wherein T is greater 100.

31. The method of claim 28 wherein T is greater than 100.

32. The method of claim 18 wherein the step of generating a signal includes the substep of generating a first signal having T portions each corresponding to a respective portion of the article, wherein T is an integer greater than P; and the substeps, performed for each of the T portions of the first signal, of selecting a threshold value based on a color of the portion of the first signal:

a second comparing step of comparing an intensity of the portion of the first signal to the selected threshold value;

selectively discarding the portion of the first signal based on a result of the second comparing step.

33. The method of claim 32 wherein P is greater than 40.

34. The method of claim 33 wherein T is greater than 100.

35. The method of claim 32 wherein T is greater than 100.

36. The method of claim 18 wherein the step of generating a signal includes the substep of generating a first signal having T portions each corresponding to a respective portion of the article, wherein T is an integer greater than P; and the substeps, performed for each of the T portions of the first signal, of a second comparing step of comparing an intensity of the portion of the first signal to a first threshold value;

selectively discarding the portion of the first signal based on a result of the second comparing step;

selecting a second threshold value based on a color of the portion of the first signal;

a third comparing step of comparing the intensity of the portion of the first signal to the second threshold value;

selectively discarding the portion of the first signal based on a result of the third comparing step.

37. The method of claim 36 wherein P is greater than 40.

38. The method of claim 37 wherein T is greater than 100.

39. The method of claim 36 wherein T is greater than 100.

40. The method of claim 18 wherein the step of generating a signal includes the substep of generating a first signal having T portions each corresponding to a respective portion of the article, wherein T is an integer greater than P; and the substeps, performed for each of the T portions of the first signal, of selecting a threshold value based on whether the corresponding portion on the article has a metallic property;

a second comparing step of comparing an intensity of the portion of the first signal to the selected threshold value;

selectively discarding the portion of the first signal based on a result of the second comparing step.

41. The method of claim 40 wherein P is greater than 40.

42. The method of claim 41 wherein T is greater than 100.

43. The method of claim 40 wherein T is greater than 100.

44. The method of claim 18 wherein P is greater than 40.

45. The method of claim 44 wherein T is greater than 100.

46. A method of sorting articles, the method comprising the steps of:

reading a code on an article;

illuminating the article;

receiving light from the article;

generating a signal corresponding to light received from P portions of the article, where P is an integer;

analyzing the signal to determine, for each portion of the article, a physical attribute corresponding to the portion;

determining the physical attribute corresponding to the maximum number (M) of portions, where M is an integer;

determining a first value based on M;

determining a second value based on the determined physical attribute;

determining a physical attribute of the article by comparing the first value to the second value;

selectively routing the article through a first path when the physical attribute corresponds to the code; and routing the article through a second path, different from the first path when the physical attribute does not correspond to the code.

* * * * *

UNITED STATES PATENT AND TRADEMARK OFFICE
CERTIFICATE OF CORRECTION

PATENT NO. : 5,435,445
DATED : July 25, 1995
INVENTOR(S) : William R. Dellinger, Jr. et al.

It is certified that error appears in the above-indentified patent and that said Letters Patent is hereby corrected as shown below:

Claim 23, col. 14, line 51, "claim 20" should read --claim 22--.

Claim 26, col. 14, line 58, "claim 26" should read --claim 25--.

Claim 27, col. 14, line 60, "claim" should read --claim 26--.

Signed and Sealed this

Tenth Day of October, 1995

*Attest:*

BRUCE LEHMAN

*Attesting Officer*      *Commissioner of Patents and Trademarks*